April 9, 1935.  J. T. FITZSIMMONS  1,997,459
IGNITION APPARATUS
Original Filed Dec. 11, 1931
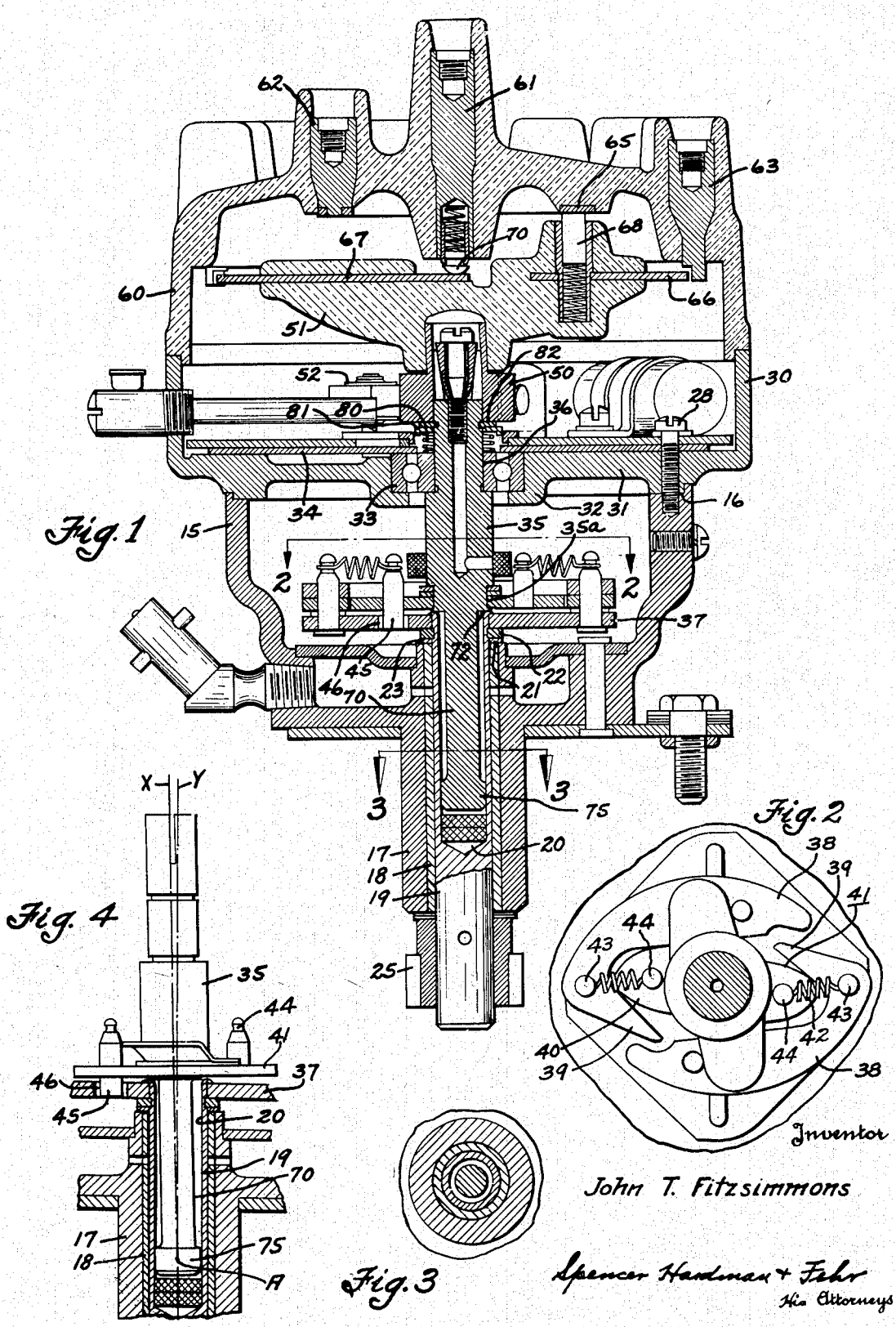
Inventor
John T. Fitzsimmons
Spencer Hardman & Fehr
His Attorneys Patented Apr. 9, 1935

1,997,459

UNITED STATES PATENT OFFICE 1,997,459

IGNITION APPARATUS

John T. Fitzsimmons, Anderson, Ind., assignor, by mesne assignments, to General Motors Corporation, Detroit, Mich., a corporation of Delaware Application December 11, 1931, Serial No. 580,311
Renewed July 7, 1934

8 Claims. (Cl. 64—90.5)

This invention relates to ignition apparatus for internal combustion engines and more particularly to ignition apparatus for controlling the ignition timing in response to engine speed conditions.

It is one of the objects of the present invention to provide certain improvements in devices of the type referred to in which the cam shaft is rotatably supported in one housing and the driven shaft is rotatably supported in another housing, the two shafts being operatively connected by engine speed responsive means for varying the angular relation between the cam shaft and the driven shaft, and in which one of the shafts is provided with means whereby the axis of each shaft need not be in absolute alignment with the other. This is accomplished by providing a device comprising a driven shaft having an axial bore, a cam shaft piloted within said driven shaft operatively connected with and capable of rotary movement relative to said driven shaft, bearing means in each housing for rotatably supporting respectively one end of said driven shaft and cam shaft, and means on the cam shaft piloted within said driven shaft to permit lateral movement of said cam shaft with respect to said driven shaft in which the device is operated in an efficient manner.

Further objects and advantages of the present invention will be apparent from the following description, reference being had to the accompanying drawing wherein a preferred embodiment of one form of the present invention is clearly shown.

In the drawing:

Fig. 1 is a vertical sectional view of an ignition timer embodying the present invention.

Figs. 2 and 3 are sectional views taken on the lines 2—2 and 3—3 of Fig. 1.

Fig. 4 is a fragmentary side view of a cam shaft mounted within the driven shaft, each shaft being shown on a different axis with respect to each other.

Referring to the drawing the ignition device is shown comprising a lower housing 15 having an opening provided with an annular recess 16 substantially in coaxial alignment with a shank 17 provided by the housing. The shank 17 is adapted to fit into an opening provided in an engine housing or crank case, not shown. The shank 17 of the housing is hollow to receive a bearing 18 to rotatably support a drive shaft 19 provided with an axial recess or bore 20. The shaft 19 is limited in its downward movement by washers 21 and 22 resting upon the upper end of a boss 23 provided by the housing 15. The washer 22 is swedged into a shallow groove provided by the shaft 19. The lower end of the shaft 19 carries a gear 25 adapted to mesh with a gear driven by the engine so that the shaft may be driven in a definite time relation thereto.

A timer housing 30 is supported in the annular recess 16 provided by the housing 15. The housing is secured in the recess 16 by screws 28 having threaded engagement with the housing 21. The housing is provided with a partition 31 having an apertured centrally extending portion 32 in which a bearing 33 is contained. A supporting plate 34 rests on the surface of the partition and holds the bearing 33 within the portion 32. The bearing 33 rotatably supports the upper end of a cam shaft 35 as at 36 and the other end of the cam shaft is supported within the axial bore 20 of engine driven shaft 19. The upper end of the shaft 19 within the housing 21 supports a plate 37 upon which are mounted a plurality of weight members 38, each weight member being provided with a finger 39 each of which is adapted to cooperate with an arm 40 of a spider 41. The spider 41 is drive-fitted upon a knurled intermediate portion 35a of the cam shaft 36 and staked over or deformed in any other suitable manner, to hold the spider upon the intermediate portion 35a. The weight members 38 are normally maintained in position shown in Fig. 2, by springs 42 each connected at one end to a stud 43 secured to the plate 37, each of the studs 43 forming a pivot for the weights 38. The other end of the springs 42 are attached to studs 44 secured to the arms of the spider 41 and in this way tends to move the weight 38 toward the shaft 35. One of the studs 44 is provided with an extended portion 45 adapted to project into an arcuate slot 46 provided in the plate 37. The portion 45 cooperates with an end of the slot 46 to limit the extreme outward movement of the weights 38.

The upper end of the cam shaft 35 supports a timer cam 50. The cam supports a distributor rotor 51. The cam cooperates with rubbing blocks provided on a plurality of circuit interrupters each having a breaker lever 52 provided with a movable contact cooperating with a stationary contact. These contacts are arranged in the usual manner, as is well known to those skilled in the art, to control the passage of current to an ignition coil, and further description is deemed unnecessary.

The housing 30 supports a distributor head 60 providing a cover therefor, a distributor head having two high tension terminals 61 and 62 and a plurality of terminals 63 in a circular row. The terminals 63 are adapted to be connected with respective spark plugs of an engine (not shown). A circular conductor track 65 is provided in the distributor head, the track being in electrical connection with the terminal 62. The rotor 51 carried by the cam 50 is provided with oppositely disposed arms angularly arranged; one arm carries a conductor strip 66; the other arm carries a conductor strip 67. Strip 66 is electrically connected with terminal 62, through a button 68 and the metallic track 65, while the strip 67 is electrically connected to terminal 61 by a button 70.

When an ignition apparatus of the character described is assembled, it has been found on various occasions that the alignment of driven shaft 19 and cam shaft 35 are not perfect. This is due to machine operations upon housing 21 and 20 on separate machines, and when assembling the housings the axis of one housing with respect to the other may be out of alignment a few thousandths of an inch, consequently, the alignment of the drive shaft 19 and the cam shaft 35 will not be perfect. In order not to scrap the various parts that are not machined to precision, the present invention provides means whereby the loss of these parts are eliminated and provide an ignition apparatus that is entirely efficient in operation. To this end, the cam shaft 35 hangs suspended from the ball bearing 33 and is provided with a reduced portion 70, forming a shoulder 72 on the cam shaft. The shoulder may rest upon the deformed or riveted portion of the shaft 19 that secures the plate 37 thereto in a fixed relation, and provides a bearing surface for the shoulder 72. The cam shaft 35 is provided with a continuation extending within the axial bore 26 of the shaft 25. The continuation has a small bearing member 75 engaging inner circumferences of the bore, the member 75 cooperating with the bore to form a hinge connection between the shaft 19 and 35, this hinge being a point where the axis of the shaft 35 meets the axis of the shaft 19 within the bore 20 and indicated by point A as shown in Fig. 4. The dot-and-dash line Y represents the axis of the shaft 19 within the bearing 18 and the line X the axis of the shaft 35 within the bearing 33. Thus when the cam shaft 35 is assembled with the drive shaft 19 the hinge connection will permit an angular longitudinal movement of the driven shaft 35 with respect to the drive shaft 19.

The ball bearing 33 is further held down in position within the portion 32 by a coil spring 80, one end of the spring 80 engaging the inner race of the bearing 33 and the other end engaging a cup-shaped washer 81. The washer 81 is held in position on the cam shaft 35 by a C-washer 82 fitted into a shoulder groove provided on the cam shaft. Thus, by this structure, the cup member 30 may be readily removed from the housing 21 without any special tools other than a screwdriver and eliminates disturbing the speed responsive devices in the housing 21. The spring 80 takes up the end play of the cam shaft 35.

When the shaft 19 is rotated by an engine through the gear 25, the weights 38 will fly out more or less according to the speed of the engine to control the angular relation between the shaft 19 and the cam shaft 35. Should the shafts 19 and 35 be out of perfect alignment, the small bearing surface 75 within the axial bore 26 of the shaft 19 will permit an efficient operation of the device. An assembly of the shafts out of alignment is shown in Fig. 4. The illustration in Fig. 4 is greatly exaggerated for sake of clearness. It is obvious therefore, that this construction permits assembling the apparatus having two shafts, one shaft piloted within the other, and in which the axis of the two shafts are not in perfect alignment but are capable to operate efficiently and as the part 75 will readily permit relative angular movement of the cam shaft 35 with respect to the driven shaft 19 and allow the speed responsive means to operate in the well known manner. This efficient operation between the two shafts is due to the small bearing member 75 of the cam shaft 35 to form a hinge relation between the shafts 19 and 35.

It is apparent from the foregoing description that in the assembly of an ignition apparatus of the character described that the assembly of the two shafts rotatably supported by bearings in different housings to operate in an efficient manner has been effected by means of very simple construction and the cost of manufacture is greatly reduced due to non-scrapping of machined parts and that the arrangement of the shafts with respect to each other in an angular relation will in no way decrease the efficiency of operation of the device or apparatus.

While the form of embodiment of the present invention as herein disclosed, constitutes a preferred form, it is to be understood that other forms might be adopted, all coming within the scope of the claims which follow.

What is claimed is as follows:

1. In a device of the character described, the combination comprising; a stationary member; a drive shaft having a coaxial bore journalled in said stationary member; a second stationary member adapted to be assembled in different fixed positions upon the first mentioned member and having an axis substantially co-axial with the axis of the first mentioned member; a driven shaft journalled in said second mentioned member, said shaft provided with an integral head and extending into said bore, the said bore serving in turn as a bearing for said head, said head being constructed so as to permit each of said shafts to rotate about its respective axis independent of the other; and means located between said stationary members for connecting the two shafts so that one drives the other and operable to rotate one shaft relative to the other.

2. In a device of the character described, the combination comprising; a stationary member; a second stationary member adapted to be mounted in fixed positions upon the first mentioned member so that the axis of each member is substantialy co-axial with that of the other; a bearing for each member, said bearings mounted about the axis of said members; a drive shaft journalled in one of said bearings and a driven shaft journalled in the other bearing, one of said shafts having a bore and the other shaft having a reduced end provided with an integral head extending into said bore, said bore serving as a bearing for said head and allowing each shaft to rotate about its own axis caused by any non-alignment of the axes of said stationary members; and means connecting said shafts so that one drives the other and said means operable to rotate one of said shafts slightly relative to the other.

3. In a device of the character described, the combination comprising; a housing; a bearing carried by said housing; a drive shaft having a longitudinal bore journaled in said bearing; a second housing secured to said first mentioned housing; a bearing carried by the second housing; a driven shaft having a head portion extending into the bore of the drive shaft to substantially align the axes of the drive and driven shafts; and speed responsive means located between said bearings and connecting said shafts so that one drives the other and said means operable to rotate one of said shafts relative to the other.

4. In a device of the character described, the combination comprising; a stationary member having a bearing; a drive shaft journaled in said bearing; a second stationary member having a bearing and located with respect to the first mentioned member so that the axis of each member is substantially co-axial with that of the other; a driven shaft journaled in said second mentioned bearing, one of said shafts having a recess and the other having an integral head portion extending into said recess to substantially align the axes of said shafts; and speed responsive means located between said stationary members connecting said shafts so that one drives the other and said means operable to rotate one of the shafts relative to the other.

5. In a device of the character described, the combination comprising; a bearing; a shaft having a longitudinal bore journalled in the bearing; a second bearing; a second shaft having end portions, one of said end portions journaled in the second mentioned bearing and the other end portion piloted within the bore to permit a slight non-alignment of the shafts; and connecting means intermediate the ends of the second mentioned shaft so that one shaft drives the other.

6. In a device of the character described, the combination comprising; a bearing; a shaft having a longitudinal bore journaled in said bearing; a second bearing; a second shaft having end portions, one of said end portions journaled in the second mentioned bearing and the other end portion journaled in the bore of the first mentioned shaft so that the axis of each shaft is substantially coaxial with that of the other; and connecting means intermediate the end portions of the second shaft for drivingly connecting both shafts.

7. In a device of the character described, the combination comprising; a bearing; a tubular shaft journaled in said bearing; a second bearing remote from the first bearing; a shaft having an end journaled in the second mentioned bearing and having the other end thereof in contact with the inner surface of the tubular shaft so as to permit a slight non-alignment of the shafts with respect to their axes and allowing each shaft to rotate about their respective axis independent of the other; and means intermediate the ends of the second mentioned shaft for connecting the two shafts so that one drives the other.

8. In a device of the character described, the combination comprising; a bearing; a shaft having an axial recess journaled in the bearing; a second bearing; a second shaft having one end journaled in the second mentioned bearing, the other end of the second mentioned shaft is provided with an enlarged portion adapted to be located within the axial recess to permit a slight non-alignment of the second shaft with respect to the first mentioned shaft; and means intermediate the ends of the second mentioned shaft for connecting the two shafts so that one drives the other, and said means operable to rotate one of the shafts relative to the other.

JOHN T. FITZSIMMONS.